United States Patent [19]
Mueller et al.

[11] Patent Number: 5,372,792
[45] Date of Patent: Dec. 13, 1994

[54] RADIAL FLOW COLD WALL REACTOR

[75] Inventors: Rodney T. Mueller, Reigate, England; Catherine M. Murray, Berkeley Heights; Donald F. Shaw, Denville; Robert F. Tammera, West Orange, all of N.J.

[73] Assignee: Exxon Research & Engineering Co., Florham Park, N.J.

[21] Appl. No.: 829,208

[22] Filed: Feb. 3, 1992

[51] Int. Cl.$^5$ ............................................. B01J 8/00
[52] U.S. Cl. ................................... 422/218; 422/220; 422/221; 422/239; 422/241; 422/242
[58] Field of Search ............... 422/218, 221, 239, 242, 422/220, 241

[56] References Cited

U.S. PATENT DOCUMENTS

| | | |
|---|---|---|
| 2,460,052 | 1/1949 | Werner . |
| 2,614,033 | 10/1952 | Cornell et al. . |
| 2,634,194 | 4/1953 | Nebeck . |
| 2,683,654 | 7/1954 | Bergman . |
| 2,833,631 | 5/1958 | Rossheim et al. . |
| 2,886,517 | 5/1959 | Patton et al. . |
| 2,982,623 | 5/1961 | Johnson . |
| 2,997,374 | 8/1961 | Lavender et al. ................. 422/218 |
| 3,091,520 | 5/1963 | Newburn ........................ 422/218 |
| 3,238,023 | 3/1966 | Craig et al. . |
| 3,533,754 | 10/1970 | Hallman . |
| 4,033,727 | 7/1977 | Vautrain ........................ 422/218 |
| 4,141,690 | 2/1979 | Persico et al. ................... 422/218 |
| 4,221,763 | 9/1980 | Greene . |
| 4,374,094 | 2/1983 | Farnham . |
| 4,374,095 | 2/1983 | Legg et al. . |
| 4,421,723 | 12/1983 | Farnham . |
| 4,452,761 | 6/1984 | Farnham . |
| 4,490,333 | 12/1984 | Humphries et al. . |
| 4,490,334 | 12/1984 | Peterson . |
| 4,690,690 | 9/1987 | Andrew et al. . |

Primary Examiner—Timothy M. McMahon
Attorney, Agent, or Firm—Joseph J. Dvorak

[57] ABSTRACT

The present invention provides a cylindrical reactor vessel having a top end with an inlet and a bottom end with an outlet end. A refractory insulating lining is applied on the interior of the wall of the vessel. A cylindrical vertically disposed first inner basket having a generally closed top first end and an open second end in communication with the outlet conduit and having fluid pervious sidewalls surrounded by a vertically disposed outer cylindrical second basket defining a space therebetween for containment of subdivided contact material. The cylindrical second basket also has a top end, which is closed, and fluid pervious sidewalls. The cylindrical second basket is spaced away from the refractory lining of the vessel at a sufficient distance, to provide an annular space for fluid, admitted through the inlet, to progress downwardly through the annular space and then radially inwardly through the contact material contained in the space between the first and second basket. The fluid, ultimately passes into the centrally located first basket for collection and then for removal through the outlet conduit. Guide means are provided at the top end of the second basket, which assists in maintaining the basket in a central position, but permitting its movement during thermal cycling of the vessel. A horizontal annular refractory ring is provided in the bottom of the vessel for supporting the second basket.

5 Claims, 3 Drawing Sheets

RADIAL FLOW COLD WALL REACTOR

Another objective of the present invention is to provide a cold wall radial flow reactor that incorporates a novel structural system for the thermal expansion and contraction of the internal metallic parts of the vessel used in containing the subdivided contacting material.

Another object of the present invention is to provide a radial flow cold wall vessel design that is suitable for retrofitting axial flow hot wall vessels.

Another object is to provide a cold wall radial flow vessel which ensures that essentially all the gas flows radially through the catalyst bed and in which bypassing the bed at the top and bottom is minimized.

It is yet another objective of the present invention to provide a cold wall radial flow reactor that has substantially reduced dead zones which are typical of prior art radial flow reactors.

SUMMARY OF THE INVENTION

Accordingly, in a representative embodiment of a reactor of the present invention, there is provided a generally cylindrical reactor vessel having a top end and a bottom end, each of which is closed by caps, having an inlet means at the top end and an outlet means at the bottom end. A refractory insulating lining is applied on the interior of the wall of the reactor vessel defining a contact zone therein. A cylindrical vertically disposed first inner basket having a generally closed top first end and an open second end in communication with the outlet conduit and having fluid pervious sidewalls surrounded by a vertically disposed outer cylindrical second basket defining a space therebetween for containment of subdivided contact material. The cylindrical second basket also has a top end, which is closed, and fluid pervious sidewalls. The cylindrical second basket is spaced away from the refractory lining or the vessel at a sufficient distance, so as to provide an annular space for fluid, admitted through the inlet, to progress downwardly through the annular space and then radially inwardly through the contact material contained in the space between the first and second basket. The fluid, of course, ultimately passes into the centrally located first basket for collection and then for removal through the outlet conduit. Guide means are provided at the top end of the second basket, which assists in maintaining the basket in a central position, but permitting its movement during thermal cycling of the reactor vessel. A horizontal annular refractory ring is provided in the bottom of the vessel for supporting the second basket. Also, a slip-fit connection is provided between the first basket and the outlet conduit which serves to support the first basket but permit movement during thermal cycling.

Other features and advantages of the present invention will become more apparent from an examination of the succeeding specification when read in conjunction with the drawings.

DETAILED DESCRIPTION OF THE INVENTION

Figure 1:
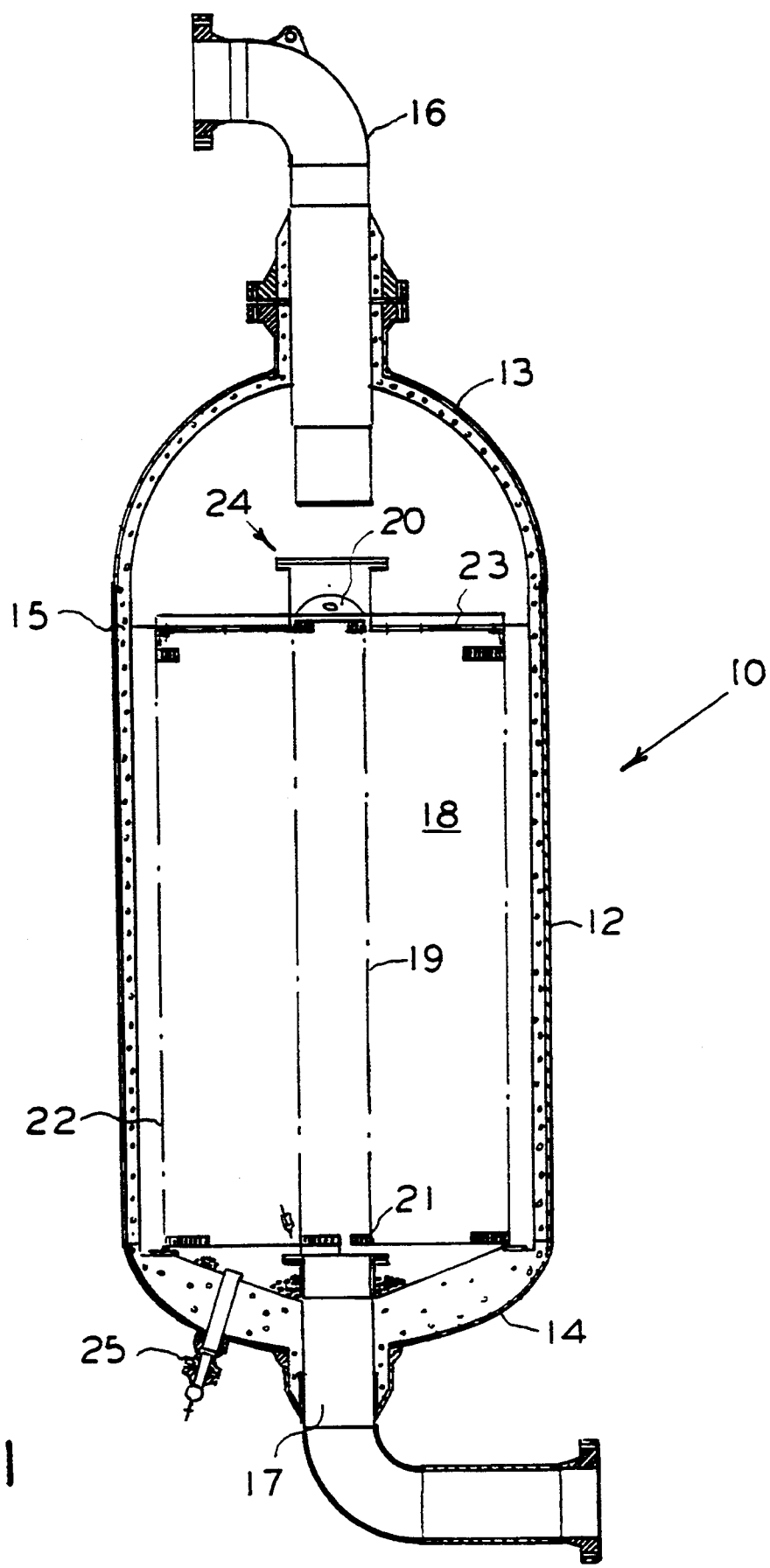
FIG. 1 is a longitudinal section of a reactor assembly of the present invention.

Referring now to the figures and, in particular, FIG. 1, a reactor vessel 10 consists essentially of a vertically disposed cylindrical shell having a cylindrical body section 12. The vessel 10 ends are closed by a top dome 13 and the bottom dish head 14. The reactor vessel 10 is provide with an internal refractory lining 15, which covers substantially the whole of the interior surface of vessel 10. The refractory lining 15 may be any conventional high temperature refractory material used in high temperature applications and may be anchored to the metal vessel walls by conventional anchoring techniques.

As is shown in FIG. 1, the top dome 13 is generally hemispherical in shape; whereas, the bottom dish 14 is generally elliptical in shape. In the practice of the present invention, it is particularly preferred that the elliptical bottom dish 14 has a ratio of the major to minor diameter of the elipse of 2:1.

Vessel 10 is provided with inlet and outlet conduits 16 and 17, respectively, for introduction of fluid reactant and removal of fluid product from the reactor vessel 10.

Vertically disposed within the cylindrical body section 12 is a cylindrical first basket 19 that has a first top end 20 and a second bottom end 21. The first end 20 is substantially a solid cap; whereas, the second end 21 is in open communication with the outlet conduit 17. The walls of the first basket 19 are substantially fluid pervious walls. Suitable materials for such walls are well known and include type 304 stainless steel.

Also vertically disposed within body section 12 is a cylindrical second basket 22, which surrounds first basket 19 and defines therebetween a concentric space 18 for the containment of subdivided contact material, such as a catalyst, The second basket 22 has a diameter less than the diameter of the body section 12, thereby providing for an annular space between the refractory 15 and the cylindrical wall of the second basket 22. The cylindrical wall of the second basket 22 is fluid pervious, and preferably is made of the same material as the cylindrical wall of the first basket 19. The second basket 22 is provided with a non-pervious top 23, which has a centrally located top hat, section 24 adapted to accommodate the positioning of first end 20 of first basket 19 and prevent gas bypassing the catalyst bed.

Vessel 10 is also provided with a conduit 25 located in the bottom dish head 14 for removal of subdivided contact material when required.

Optionally, the reactor vessel may contain access means for thermocouples, catalyst sampling devices, pressure taps, and the like, none of which are shown.

Figure 2:
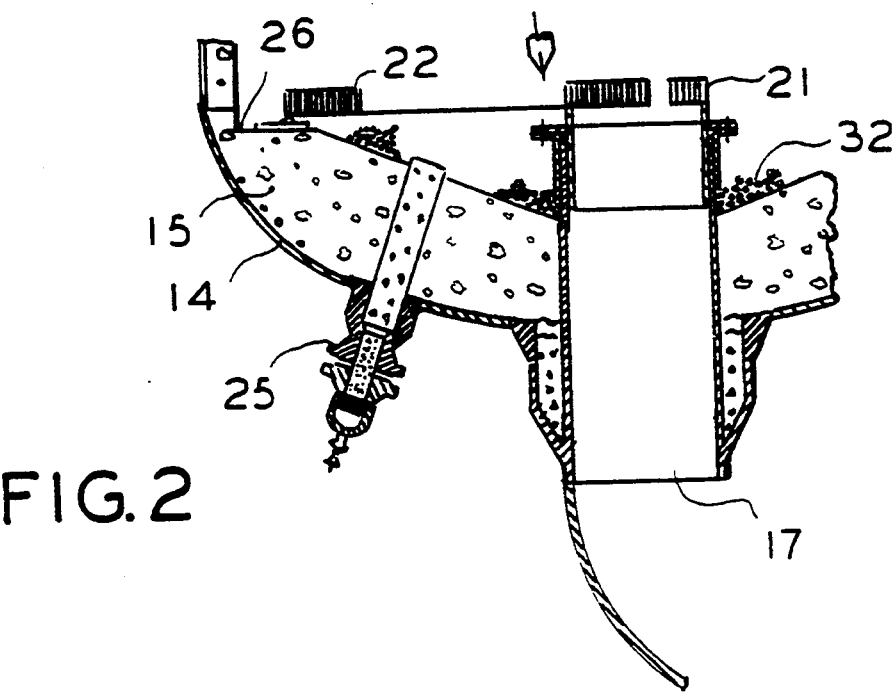
FIG. 2 is an enlarged longitudinal section of the lower part of the assembly shown in FIG. 1.
Figure 3:
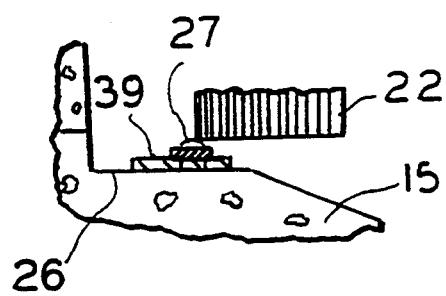
FIG. 3 is an enlarged diagrammatic section showing the base support mechanism for the second basket.

Turning now to FIGS. 2 and 3, it can be seen that the refractory lining 15 in the bottom dish head 14 is positioned so as to provide a substantially horizontal annular ring portion 26 at about the top of the dish 14 and extending inwardly for a distance sufficient that a substantial portion of the annular ring would encompass a circular line having a diameter equal to the diameter of the second basket. Thus, the horizontal annular ring portion 26 of the refractory 15 in bottom dish 14 supports the second basket 22 at its bottom. Optionally and preferably, a foot part 27 is a continuous annular ring. Also preferably, an annular metal ring 39 sized and positioned so as to sit on the annular ring portion 26 of refractory 15 is provided, which serves as a foundation surface and accommodates radial expansion with minimal friction.

Figure 4:
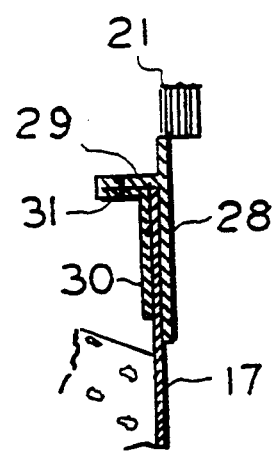
FIG. 4 is an enlarged schematic diagram showing the support mechanism for the first basket shown in FIG. 2.

Referring now in particular to FIGS. 2 and 4, it can be seen that the conduit 17 extends upwardly into the vessel 10 substantially to the top of dish 14. The bottom end 21 of first basket 19 is supported by a cylindrical tube 28 adapted to move slidably within conduit 17. Cylindrical tube 28 is provided with an outwardly extending flange 29, which acts as a stop, so that the elevation of the bottom first basket 19 is at the same elevation as the bottom of the second basket 22. Since cylindrical tube 28 is in slidable contact with the conduit 17, the arrangement can be best described as a slip-fit. This, of course, permits movement of the first basket 19 independent of the movement of second basket 22 during thermal cycling, where the first and second baskets may be at different temperatures. Optionally and preferably, a second cylindrical tube 30 is provided and disposed concentrically with the cylindrical tube 28, defining an annular ring for encompassing the conduit 17 at its upper end. As is shown in FIG. 4, in particular, the second cylindrical tube 30 also has a flange 31, which is adapted to be bolted to or in some other fashion fastened to flange 29.

As can be seen in FIG. 2, the refractory 15 on the surface of dish bottom 14 does not extend all the way up to the top of the dish. Therefore, it is desirable to fill the unoccupied space below the body section 12 with an inert material, such as ceramic balls and the like. This fill substantially reduces the dead zone normally encountered in radial flow reactors.

Figure 5:
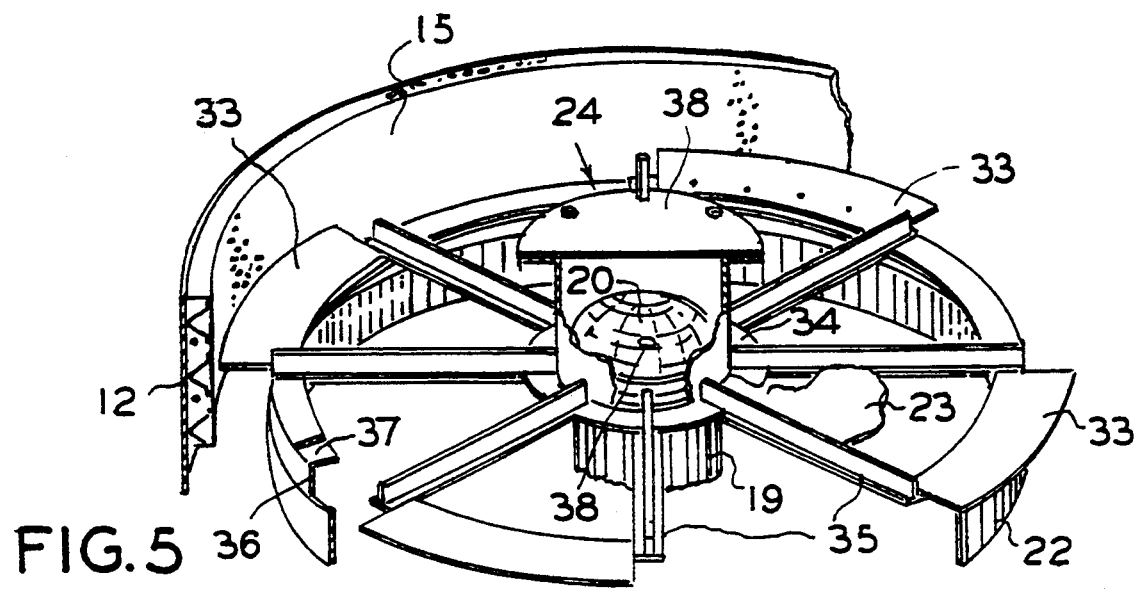
FIG. 5 is an isometric view of the upper internal guide and support system for the reactor assembly of the present invention.

Guide means are provided to maintain the second basket 22 substantially centrally positioned within body section 12. A particularly preferred guide means is shown in FIG. 5 and consists of a plurality of segmented plates 33 that extend outwardly from the top 23 of second basket 22 and while plates are in movable contact with the refractory lining 15. In general, about 4 such segmented plates are adequate and, obviously, such plates will be located substantially equidistant from each other. In this way, the outer basket 22 will be maintained substantially in its central position and yet access of fluids into the annular ring region around the outer periphery of basket 22 will be assured.

FIG. 5 also shows a particularly preferred support system for second basket 22 and its roof 23. The support system consists of an annular ring 34, which has an inner diameter sufficient to accept passage of top end 20 of the first basket 19 therethrough. Fastened to annular ring 34 are a plurality of radially extending beams 35. As is shown in FIG. 5, these beams are substantially T-shaped in cross-section and extend outwardly to the cylindrical wall of the second basket 22. In a particularly preferred embodiment of the present invention, a fluid impervious cylindrical ring 36 is provided, which has a diameter which is the same as the diameter of the second basket 22 and which is fastened at its bottom end to basket 22 and at its top end is provided with an inwardly extending flange 37 for connection to radial beams 35. Additionally, the segmented plates 33 may be attached to the flange 37 and the top 23, as is shown in greater detail in FIG. 6.

Figure 6:
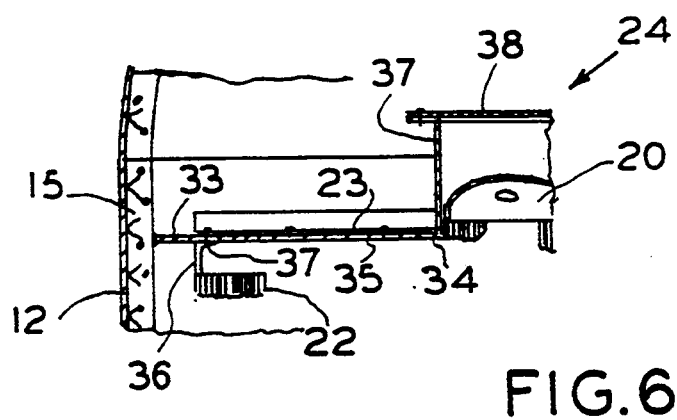
FIG. 6 is a diagrammatic view of a section of the top and support system for the second basket.

As is shown in FIGS. 1, 5 and 6, top 23 of second basket 22 has a top hat section 24 which extends upwardly from the central region of top 23. It comprises a vertically disposed cylindrical section 37 and a horizontal top 38. The diameter of the cylindrical section 37 is sufficient to accommodate receipt of the first end 20 of first basket 19. As is shown in the figures, the first end 20 is generally elliptical in shape and the horizontal top 38 of top hat section 24 is spaced sufficiently from the first end 20, so as to provide for expansion of first basket 19. Optionally, but preferably, the first end 20 of first basket 19 is provided with a weep hole 38, which will enhance the operation the relative movement of first basket 19 with respect to the movement of second basket 22.

In operation then, the fluid material can be entered into the reactor vessel 10 via line 16 and travel downwardly into the annular space between the refractory 15 and basket 22. Since the wall of basket 22 is fluid pervious, the fluid will travel radially inward for contact with the contact material contained within the basket. The end product will thereafter flow radially through the fluid pervious wall of basket 19 for collection and removal from the vessel via line 17.

Axial flow reactor vessels may readily be converted to radial flow cold wall reactors using the unique system of the invention.

Additionally, the unique system of the present invention minimizes the gas/fluid bypassing of the catalyst bed.

What is claimed is:

1. A reactor vessel comprising:
   a vertically disposed cylindrical shell defining a contact zone, the shell having a top end and a bottom end;
   caps closing the top end and the bottom end;
   fluid inlet means in the top end and fluid outlet means in the bottom end;
   a refractory insulating lining covering the interior of the vessel;
   a cylindrical vertically disposed first basket with a fluid-pervious wall and having a generally closed top first end and an open bottom second end, the second end being in communication with the outlet means;
   a cylindrical vertically disposed second basket with a fluid-pervious wall surrounding the first basket and defining there between a containment space for contact material, the second basket having a diameter less than the diameter of the vessel thereby an annular space is provided between the refractory coating the vessel wall and the second basket, the second basket including a closed top and a bottom end;
   a horizontal annular surface on the refractory coating on the cap closing the bottom end of the shell, the annular surface positioned for supporting the second basket at the bottom end of the basket;
   an annular metal ring interposed between the bottom of the second basket and the annular surface on the refractory coating, thru metal ring signed and positioned to set on annular surface of the refractor whereby radial expansion of the second basket is accommodated.
   a plurality of segmented sections attached to the top of the second basket for maintaining the second basket in a central position in the vessel while permitting movement of the basket during thermal cycling of the vessel; and, movable support means at the bottom end of the first basket permitting movement of the first basket during thermal cycling.

2. The vessel of claim 1 wherein the top of the second basket includes a centrally located top hat section adapted to receive and guide the top end of the first basket during thermal cycling.

3. The vessel of claim 2 wherein the top end of the first basket includes a weep hole.

4. The vessel of claim 3 wherein the bottom cap of the vessel is a dish of elliptical shape.

5. The vessel of claim 4 wherein the free space between the refractory on the surface of the bottom cap and the bottom end of the cylindrical shell is filled with an inert particulate material.

* * * * *